United States Patent
Shimada et al.

(10) Patent No.: US 12,378,347 B2
(45) Date of Patent: Aug. 5, 2025

(54) POLYMERIZABLE COMPOSITION FOR OPTICAL ARTICLE AND OPTICAL ARTICLE

(71) Applicant: HOYA LENS THAILAND LTD., Pathumthani (TH)

(72) Inventors: Takuya Shimada, Tokyo (JP); Kei Kobayashi, Tokyo (JP); Teruo Yamashita, Tokyo (JP); Tsuyoshi Watanabe, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 660 days.

(21) Appl. No.: 17/705,954

(22) Filed: Mar. 28, 2022

(65) Prior Publication Data

US 2022/0220235 A1  Jul. 14, 2022

Related U.S. Application Data

(63) Continuation of application No. PCT/JP2020/047319, filed on Dec. 18, 2020.

(30) Foreign Application Priority Data

Dec. 27, 2019  (JP) .................. 2019-239793

(51) Int. Cl.
| | | |
|---|---|---|
| *C08F 290/06* | (2006.01) | |
| *G02B 1/04* | (2006.01) | |
| *G02B 5/23* | (2006.01) | |
| *C09K 9/02* | (2006.01) | |

(52) U.S. Cl.
CPC ........ *C08F 290/06* (2013.01); *C08F 290/062* (2013.01); *G02B 1/041* (2013.01); *G02B 5/23* (2013.01); *C09K 9/02* (2013.01)

(58) Field of Classification Search
CPC .. A21C 3/04; A21C 9/065; A23G 3/28; A23P 30/20; B29C 64/106; B29C 64/20; B29C 64/209; B33Y 10/00; B33Y 30/00; C08L 33/10; G02B 1/041; G02B 5/23; G02C 7/10; G05B 2219/30; C08F 222/102; C08F 222/103; C08F 290/06; C08F 290/062; C09K 9/02
See application file for complete search history.

(56) References Cited

U.S. PATENT DOCUMENTS

| | | |
|---|---|---|
| 2005/0263745 A1 | 12/2005 | Momoda et al. |
| 2011/0249234 A1 | 10/2011 | Duis et al. |
| 2011/0249235 A1 | 10/2011 | Duis et al. |
| 2011/0260125 A1 | 10/2011 | Zhang et al. |
| 2019/0161585 A1 | 5/2019 | Izumi et al. |

FOREIGN PATENT DOCUMENTS

| | | | |
|---|---|---|---|
| CN | 103703029 A | | 4/2014 |
| EP | 3418347 A1 | * | 12/2018 |
| JP | 2002-201230 A | | 7/2002 |
| JP | 4016119 B2 | | 12/2007 |
| JP | 2012-511091 A | | 5/2012 |
| WO | 03/011967 A1 | | 2/2003 |
| WO | 2010/066071 A1 | | 6/2010 |
| WO | 2010/066555 A2 | | 6/2010 |
| WO | 2019/182085 A1 | | 9/2019 |
| WO | 2019/189855 A1 | | 10/2019 |

OTHER PUBLICATIONS

Jul. 19, 2023 Office Action issued in Chinese Patent Application No. 202080073192.2.
Jan. 23, 2024 Office Action issued in Chinese Patent Application No. 202080073192.2.
Dec. 6, 2023 Search Report issued in European Patent Application No. 20907486.3.
Apr. 11, 2023 Office Action Issued in Japanese Patent Application No. 2019-239793.
Feb. 22, 2021 International Search Report issued in International Patent Application No. PCT/JP2020/047319.
Jun. 28, 2022 International Preliminary Report on Patentability issued in International Patent Application No. PCT/JP2020/047319.

* cited by examiner

*Primary Examiner* — Lawrence D Ferguson
(74) *Attorney, Agent, or Firm* — Oliff PLC

(57) ABSTRACT

Provided is a polymerizable composition for an optical article including a photochromic compound, a component A: an acyclic methacrylate having a molecular weight of 500 or more, and a component B: a hydroxy group-containing (meth)acrylate.

11 Claims, No Drawings

POLYMERIZABLE COMPOSITION FOR OPTICAL ARTICLE AND OPTICAL ARTICLE

CROSS-REFERENCE TO RELATED APPLICATIONS

This application is a Continuation of PCT International Application No. PCT/JP2020/047319 filed on Dec. 18, 2020, which was published under PCT Article 21(2) in Japanese and claims priority under 35 U.S.C. § 119(a) to Japanese Patent Application No. 2019-239793 filed on Dec. 27, 2019. Each of the above applications is hereby expressly incorporated by reference, in its entirety, into the present application.

TECHNICAL FIELD

The present disclosure relates to a polymerizable composition for an optical article and an optical article.

BACKGROUND ART

A photochromic compound is a compound having a property of developing a color under emission of light in a wavelength range having photoresponsivity and fading without light emission (photochromic properties). As a method of imparting photochromic properties to an optical article such as a spectacle lens, a method in which a coating containing a photochromic compound and a polymerizable compound is provided on a substrate, and the coating is cured to form a cured layer having photochromic properties (photochromic layer) may be exemplified (for example, refer to PTL 1, which is expressly incorporated herein by reference in its entirety).

CITATION LIST

Patent Literature

[PTL 1] WO 2003/011967

SUMMARY

Examples of properties desired for an optical article having the photochromic properties described above include excellent adhesion between a photochromic layer and an adjacent layer.

One aspect of the present disclosure provides a polymerizable composition for an optical article which allows a photochromic layer having excellent adhesion with respect to an adjacent layer to be formed.

One aspect of the present disclosure relates to a polymerizable composition for an optical article (hereinafter simply referred to as a "composition"), including
 a photochromic compound;
 a component A: an acyclic methacrylate having a molecular weight of 500 or more, and
 a component B: a hydroxy group-containing (meth)acrylate.

The composition contain the component A and the component B. Thereby, the photochromic layer formed by curing the composition can exhibit excellent adhesion with respect to an adjacent layer.

According to one aspect of the present disclosure, it is possible to provide a composition for an optical article which allows a photochromic layer having excellent adhesion with respect to an adjacent layer to be formed. In addition, according to one aspect of the present disclosure, it is possible to provide an optical article having a photochromic layer having excellent adhesion with respect to an adjacent layer.

DESCRIPTION OF EMBODIMENTS

[Polymerizable Composition for Optical Article]

Hereinafter, a polymerizable composition for an optical article according to one aspect of the present disclosure will be described in more detail.

In the present disclosure and this specification, the polymerizable composition is a composition containing a polymerizable compound. The polymerizable compound is a compound having a polymerizable group. The polymerizable composition for an optical article according to one aspect of the present disclosure is a polymerizable composition used for producing an optical article, and can be a coating composition for an optical article, and more specifically, a coating composition for forming a photochromic layer of an optical article. The coating composition for an optical article is a composition applied to a substrate or the like for producing an optical article. Examples of optical articles include various lenses such as a spectacle lens and a goggles lens, a visor (cap) of a sun visor, and a shield member of a helmet. For example, a spectacle lens produced by applying the composition to a lens substrate becomes a spectacle lens having a photochromic layer and can exhibit photochromic properties.

In the present disclosure and this specification, "(meth)acrylate" refers to both an acrylate and a methacrylate. An "acrylate" is a compound having one or more acryloyl groups in one molecule. A "methacrylate" is a compound having one or more methacryloyl groups in one molecule. The number of functional groups of the (meth)acrylate is the number of groups selected from the group consisting of acryloyl groups and methacryloyl groups contained in one molecule. In the present disclosure and this specification, a "methacrylate" contains only a methacryloyl group as a (meth)acryloyl group, and something that contains an acryloyl group and a methacryloyl group as (meth)acryloyl groups is an acrylate. The acryloyl group may be contained in the form of an acryloyloxy group, and the methacryloyl group may be contained in the form of a methacryloyloxy group. The "(meth)acryloyl group" described below refers to both an acryloyl group and a methacryloyl group, and "(meth)acryloyloxy group" refers to both an acryloyloxy group and a methacryloyloxy group. In addition, unless otherwise specified, the groups described may have substituents or may be unsubstituted. If a group has a substituent, examples of substituents include an alkyl group (for example, an alkyl group having 1 to 6 carbon atoms), a hydroxy group, an alkoxy group (for example, an alkoxy group having 1 to 6 carbon atoms), a halogen atom (for example, a fluorine atom, a chlorine atom, and a bromine atom), a cyano group, an amino group, a nitro group, an acyl group, and a carboxyl group. In addition, for a group having a substituent, the "number of carbon atoms" is the number of carbon atoms of a part containing no substituents.

<Polymerizable Compound>

The composition contains at least a component A and a component B as polymerizable compounds. Hereinafter, the component A and the component B will be described.

(Component A)

The component A is an acyclic methacrylate having a molecular weight of 500 or more. In the present disclosure and this specification, "acyclic" means that a compound does not include a cyclic structure. On the other hand, "cyclic" means that a compound includes a cyclic structure. The acyclic methacrylate is a mono- or higher-functional methacrylate that does not include a cyclic structure.

The component A can be a monofunctional or bi- or higher-functional methacrylate, and can be a bifunctional or trifunctional methacrylate, and can be a bifunctional methacrylate. Examples of components A include polyalkylene glycol dimethacrylate. The polyalkylene glycol dimethacrylate can be represented by the following Formula 1:

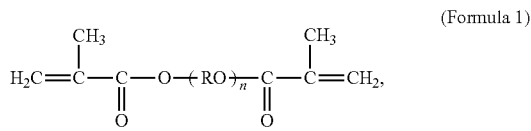
(Formula 1)

R represents an alkylene group, and n represents the number of repetitions of alkoxy groups represented by RO, and is 2 or more. Examples of alkylene groups represented by R include an ethylene group, a propylene group, and a tetramethylene group. n is 2 or more, and may be, for example, 30 or less, 25 or less or 20 or less. Specific examples of polyalkylene glycol dimethacrylate include polyethylene glycol dimethacrylate, polypropylene glycol dimethacrylate, and polytetramethylene glycol dimethacrylate.

The molecular weight of the component A is 500 or more. A photochromic layer formed from the composition containing an acyclic bifunctional methacrylate having a molecular weight of 500 or more (a component A) together with a component B, which will be described below in detail, can exhibit high adhesion with respect to an adjacent layer. Here, in the present disclosure and this specification, for the molecular weight of the polymer, a theoretical molecular weight calculated from the structural formula determined by structural analysis of the compound or the raw material preparation ratio during production is used. The molecular weight of the component A is 500 or more, can be 510 or more, can be 520 or more, can be 550 or more, can be 570 or more, can be 600 or more, can be 630 or more, and can be 650 or more. The molecular weight of the component A can be, for example, 2000 or less, 1500 or less, 1200 or less, 1000 or less, or 800 or less, in order to increase the hardness of the photochromic layer.

(Component B)

The component B is a hydroxy group-containing (meth)acrylate. The number of hydroxy groups contained in one molecule of the component B is 1 or more, and can be 2 or more. In addition, the number of hydroxy groups contained in one molecule of the component B can be 4 or less and can be 3 or less. The number of functional groups of the component B is 1 or more (that is, mono- or higher-functional), and can be 2 or more. In addition, the number of functional groups can be 3 or less. The component B may contain, as a (meth)acryloyl group, only an acryloyl group, only a methacryloyl group, or an acryloyl group and a methacryloyl group. In one aspect, the component B can contain only a methacryloyl group as a (meth)acryloyl group, that is, a methacrylate. The molecular weight of the component B may be, for example, in a range of 300 to 400, but is not limited to this range. Specific examples of components B include 2-hydroxy ethyl(meth)acrylate, hydroxypropyl (meth)acrylate, 4-hydroxybutyl (meth) acrylate, 1,4-cyclohexanedimethanol monoacrylate, 2-hydroxy-1-acryloxy-3-methacryloxypropane, 2-hydroxy-1,3-dimethacryloxypropane, pentaerythritol tetraacrylate, 2-hydroxy-3-phenoxypropyl acrylate, monoacryloyloxyethyl hexahydrophthalate, 2-acryloyloxyethyl phthalate, and 2-(acryloxyoxy)ethyl 2-hydroxyethyl phthalate. In addition, in one aspect, the component B may have an amide group. Specific examples of components B having an amide group include N-(2-hydroxyethyl)acrylamide. In addition, in one aspect, the component B may have an epoxy ester structure. The epoxy ester structure is a structure generated by a reaction between an epoxy group and a carboxyl group, and represented by "—CH(OH)—CH$_2$—O—C(=O)—." Examples of commercial products of the component B having an epoxy ester structure include Epoxy Ester 40EM (commercially available from Kyoeisha Chemical Co., Ltd.), Epoxy Ester 70PA (commercially available from Kyoeisha Chemical Co., Ltd.), Epoxy Ester 80MFA (commercially available from Kyoeisha Chemical Co., Ltd.), Epoxy Ester 200PA (commercially available from Kyoeisha Chemical Co., Ltd.), Epoxy Ester 3002M (N) (commercially available from Kyoeisha Chemical Co., Ltd.), Epoxy Ester 3002A (N) (commercially available from Kyoeisha Chemical Co., Ltd.), Epoxy Ester 3000MK (commercially available from Kyoeisha Chemical Co., Ltd.), and Epoxy Ester 3000A (commercially available from Kyoeisha Chemical Co., Ltd.).

The composition may contain, as a polymerizable compound, only the component A and the component B in one aspect, or may contain one or more types of other polymerizable compounds in addition to the component A and the component B in another aspect. Hereinafter, other polymerizable compounds that may be incorporated into the composition will be exemplified.

(Other Polymerizable Compounds)

A component C and a component D exemplified below can be components which can contribute to improving the performance such as coating suitability of the composition without significantly influencing color development under light emission and visible light transmission without light emission of the photochromic layer formed from the composition.

Component C

In one aspect, the composition may contain an acyclic tri- or higher-functional (meth)acrylate (component C). The component C can be tri- to pentafunctional (meth)acrylate, can be a trifunctional or tetrafunctional (meth)acrylate, and can be a trifunctional (meth)acrylate. Specific examples of components C include pentaerythritol tri(meth)acrylate, pentaerythritol tetra(meth)acrylate, dipentaerythritol tetra (meth)acrylate, trimethylolethane tri(meth)acrylate, trimethylolpropane tri(meth)acrylate, ditrimethylolpropane tetra (meth)acrylate, tetramethylolmethane tetra(meth)acrylate, and tetramethylolmethane tri(meth)acrylate. The molecular weight of the component C may be, for example, in a range of 200 to 400, but is not limited to this range. The component C may contain, as a (meth)acryloyl group, only an acryloyl group, only a methacryloyl group, or an acryloyl group and a methacryloyl group. In one aspect, the acyclic tri- or higher-functional (meth)acrylate can contain, as a (meth)acryloyl group, only a methacryloyl group, that is, a methacrylate.

Component D

In one aspect, the composition may contain a (meth) acrylate (component D) having a molecular weight of 400 or less and represented by the following Formula 2:

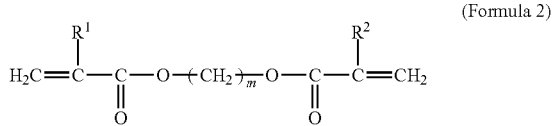

(Formula 2)

In Formula 2, $R^1$ and $R^2$ each independently represent a hydrogen atom or a methyl group, and m represents an integer of 1 or more. m is 1 or more, and may be, for example, 10 or less, 9 or less, 8 or less, 7 or less or 6 or less.

The molecular weight of the component D is 400 or less, and in order to further increase the coloring density when the photochromic layer develops a color under light emission, the molecular weight can be 350 or less, can be 300 or less, and can be 250 or less. In addition, the molecular weight of the component D may be, for example, 100 or more, 150 or more or 200 or more.

The component D may contain, as a (meth)acryloyl group, only an acryloyl group, only a methacryloyl group, or an acryloyl group and a methacryloyl group. In one aspect, the component D can contain only an acryloyl group as a (meth)acryloyl group. Specific examples of components E include 1,9-nonane diol diacrylate, 1,6-hexanediol diacrylate, and 1,10-decanediol diacrylate.

In one aspect, the composition may contain, as a polymerizable compound, one or more types of other polymerizable compounds in addition to the above components. In the composition, the content of the component A can be 50.0 mass % or more and can be 55.0 mass % or more based on a total amount of 100 mass % of the polymerizable compounds contained in the composition. In one aspect, the component A may be a component whose proportion is the largest among the plurality of polymerizable compounds contained in the composition. In addition, the content of the component A may be 90.0 mass % or less, 85.0 mass % or less, 80.0 mass % or less, 75.0 mass % or less or 70 mass % or less based on a total amount of 100 mass % of the polymerizable compounds contained in the composition. The composition may contain only one type of component A in one aspect, and may contain two or more types thereof in another aspect. When the composition contains two or more types of components A, the content of the component A is a total content of two or more types thereof. This point is the same as for the content of other components.

Regarding the component B, in order to further improve adhesion with respect to an adjacent layer, the content of the component B can be 5.0 mass % or more and can be 10.0 mass % or more based on a total amount of 100 mass % of the polymerizable compounds contained in the composition. In addition, in order to improve the photoresponsivity of the photochromic compound in the photochromic layer, the content of the component B can be 40.0 mass % or less and can be 35.0 mass % or less based on a total amount of 100 mass % of the polymerizable compounds contained in the composition.

Regarding the component C, the content of the component C may be 0 mass %, and may be 0 mass % or more, more than 0 mass %, 1.0 mass % or more, 3.0 mass % or more, 5 mass % or more or 7 mass % or more based on a total amount of the polymerizable compounds contained in the composition. The content of the component C may be, for example, 20.0 mass % or less or 15.0 mass % or less based on a total amount of the polymerizable compounds contained in the composition.

Regarding the component D, the content of the component D may be 0 mass %, and may be 0 mass % or more, more than 0 mass %, 1.0 mass % or more, 3.0 mass % or more or 5.0 mass % or more based on a total amount of the polymerizable compounds contained in the composition. The content of the component D may be, for example, 25.0 mass % or less, 20.0 mass % or less or 15.0 mass % or less, based on a total amount of the polymerizable compounds contained in the composition.

The content of the polymerizable compound in the composition may be, for example, 80.0 mass % or more, 85.0 mass % or more or 90.0 mass % or more based on a total amount of 100 mass % of the composition. In addition, the content of the polymerizable compound in the composition may be, for example, 99.0 mass % or less, 95.0 mass % or less, 90.0 mass % or less or 85.0 mass % or less based on a total amount of 100 mass % of the composition. In the present disclosure and this specification, regarding the content, the "total amount of the composition" is a total amount of all components excluding a solvent in the composition containing the solvent. The composition may or may not contain a solvent. When the composition contains a solvent, any solvent in an arbitrary amount can be used as a usable solvent as long as it does not inhibit progress of the polymerization reaction of the polymerizable composition.

<Photochromic Compound>

The composition contains a photochromic compound together with the polymerizable compound. Regarding the photochromic compound contained in the composition, known compounds exhibiting photochromic properties can be used. The photochromic compound can exhibit photochromic properties with respect to, for example, ultraviolet rays. Examples of photochromic compounds include compounds having a known framework exhibiting photochromic properties such as fulgimide compounds, spirooxazine compounds, chromene compounds, and indeno-fused naphthopyran compounds. The photochromic compounds may be used alone or two or more thereof may be used in combination. The content of the photochromic compound of the composition may be, for example, about 0.1 to 15.0 mass % based on a total amount of 100 mass % of the composition, but is not limited to this range.

<Other Components>

The composition may contain one or more types of various additives that can be generally added to the composition containing the polymerizable composition and the photochromic compound in an arbitrary content in addition to the polymerizable compound and the photochromic compound. Examples of additives that can be added to the composition may include a polymerization initiator that allows a polymerization reaction to proceed.

Regarding the polymerization initiator, a known polymerization initiator can be used, and a radical polymerization initiator can be used, and only a radical polymerization initiator can be contained as a polymerization initiator. In addition, regarding the polymerization initiator, a photopolymerization initiator or a thermal polymerization initiator can be used, and in order for a polymerization reaction to proceed in a short time, a photopolymerization initiator can be used. Examples of photoradical polymerization initiators include benzoin acetals such as 2,2-dimethoxy-1,2-diphenylethane-1-one; α-hydroxyketones such as 1-hydroxycyclohexylphenyl ketone, 2-hydroxy-2-methyl-1-phenylpropan-1-one, and 1-[4-(2-hydroxyethoxy)phenyl]-2-hydroxy-2-methyl-1-propane-1-one; α-aminoketones such as 2-benzyl-2-dimethylamino-1-(4-morpholinophenyl)-butane-1-one, and 1,2-methyl-1-[4-(methylthio)phenyl]-2- morpholinopropan-1-one; oxime esters such as 1-[(4-phenylthio)phenyl]-1,2-octadione-2-(benzoyl)oxime; phosphine oxides such as bis(2,4,6-trimethylbenzoyl)phenylphosphine oxide, bis(2,6-dimethoxybenzoyl)-2,4,4-trimethylpentyl phosphine oxide, and 2,4,6-trimethylbenzoyldiphenylphosphine oxide; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, and 2-(p-methoxyphenyl)-4,5-diphenylimidazole dimer; benzophenone compounds such as benzophenone, N,N'-tetramethyl-4,4'-diaminobenzophenone, N,N'-tetraethyl-4,4'-diaminobenzophenone, and 4-methoxy-4'-dimethylaminobenzophenone; quinone compounds such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ethers such as benzoin methyl ether, benzoin ethyl ether, and benzoin phenyl ether; benzoin compounds such as benzoin, methyl benzoin, and ethyl benzoin; benzyl compounds such as benzyl dimethyl ketal; acridine compounds such as 9-phenylacridine, 1,7-bis (9,9'-acridinyl heptane); and N-phenylglycine, and coumarin. In addition, in the 2,4,5-triarylimidazole dimer, substituents on the aryl groups of two triarylimidazole moieties may provide the same symmetric compound, or may provide different asymmetric compounds. In addition, a thioxanthone compound and a tertiary amine may be combined such as a combination of diethylthioxanthone and didimethylaminobenzoic acid. Among these, in consideration of curability, transparency and heat resistance, α-hydroxyketone and phosphine oxide can be used. The content of the polymerization initiator may be, for example, in a range of 0.1 to 5.0 mass % based on a total amount of 100 mass % of the composition.

Known additives that can be generally added to the composition containing a photochromic compound, for example, additives such as a surfactant, an antioxidant, a radical scavenger, a light stabilizer, a UV absorbing agent, an anti-coloring agent, an antistatic agent, a fluorescent dye, a dye, a pigment, a fragrance, a plasticizer, a silane coupling agent in an arbitrary amount can be additionally added to the composition. Known compounds can be used as these additives.

The composition can be prepared by simultaneously or sequentially mixing the various components described above in any order.

[Optical Article]

One aspect of the present disclosure relates to an optical article including a substrate and a photochromic layer obtained by curing the composition.

Hereinafter, the optical article will be described in more detail.

<Substrate>

The optical article can have a photochromic layer on a substrate selected according to the type of the optical article. As an example of the substrate, a spectacle lens substrate may be a plastic lens substrate or a glass lens substrate. The glass lens substrate may be, for example, a lens substrate made of inorganic glass. The lens substrate can be a plastic lens substrate because it is light-weight, hard to break, and easy to handle. Examples of plastic lens substrates include styrene resins such as (meth)acrylic resins, allyl carbonate resins such as polycarbonate resins, allyl resins, and diethylene glycol bis(allyl carbonate) resins (CR-39), vinyl resins, polyester resins, polyether resins, urethane resins obtained by reacting an isocyanate compound with a hydroxy compound such as diethylene glycol, thiourethane resins obtained by reacting an isocyanate compound with a polythiol compound, and a cured product (generally referred to as a transparent resin) obtained by curing a curable composition containing a (thio)epoxy compound having one or more disulfide bonds in the molecule. As the lens substrate, an undyed lens (colorless lens) may be used or a dyed lens (colored lens) may be used. The refractive index of the lens substrate may be, for example, about 1.60 to 1.75. However, the refractive index of the lens substrate is not limited to the above range, and may be within the above range, or may be vertically separated from the above range. In the present disclosure and this specification, the refractive index is a refractive index for light having a wavelength of 500 nm. In addition, the lens substrate may be a lens having refractive power (so-called prescription lens) or a lens having no refractive power (so-called no-prescription lens).

The spectacle lens may include various lenses such as a single focus lens, a multifocal lens, and a progressive power lens. The type of the lens is determined by the surface shape of both sides of the lens substrate. In addition, the surface of the lens substrate may be a convex surface, a concave surface, or a flat surface. In a general lens substrate and spectacle lens, the object-side surface is a convex surface and the eyeball-side surface is a concave surface. However, the present disclosure is not limited thereto. The photochromic layer may be generally provided on the object-side surface of the lens substrate, or may be provided on the eyeball-side surface.

<Photochromic Layer>

The photochromic layer of the optical article can be formed by directly applying the composition onto the surface of the substrate or indirectly applying the composition onto the surface of the substrate with one or more other layers, and performing a curing treatment on the applied composition. As the coating method, known coating methods such as a spin coating method and a dip coating method can be used, and a spin coating method can be used in consideration of coating uniformity. The curing treatment may be light emission and/or heat treatment, and the curing treatment can be light emission in order for the curing reaction to proceed in a short time. Curing treatment conditions may be determined according to the types of various components (polymerizable compounds, polymerization initiators and the like described above) contained in the composition, and the formulation of the composition. The thickness of the photochromic layer formed in this manner can be, for example, in a range of 5 to 80 μm, and can be in a range of 20 to 60 μm.

<Primer Layer>

In the optical article, in one aspect, the photochromic layer may be adjacent to the substrate or may be adjacent to the primer layer provided on the substrate. Here, "adjacent" means that components are in direct contact with each other with no other interposing layers. Examples of primer layers include known primer layers for improving the adhesion between the photochromic layer and the substrate.

In addition, as one aspect of the primer layer, a cured layer obtained by curing the polymerizable composition for forming a primer layer containing the component B described above may be exemplified. Hereinafter, such a polymerizable composition for forming a primer layer will be described in more detail.

The component B contained in the polymerizable composition for forming a primer layer is as described above. In one aspect, the polymerizable composition for forming a primer layer may contain a polyisocyanate in addition to the component B. The polyisocyanate is a compound having two or more isocyanate groups in one molecule. The number of isocyanate groups contained in one molecule of the polyisocyanate is 2 or more, and can be 3 or more. In addition, the number of isocyanate groups contained in one molecule of the polyisocyanate may be, for example, 6 or less, 5 or less or 4 or less. The molecular weight of the polyisocyanate may be, for example, in a range of 100 to 500, but is not limited to this range. Specific examples of polyisocyanates include aromatic diisocyanates such as xylylene diisocyanate, phenylene diisocyanate, tolylene diisocyanate, diphenylmethane diisocyanate, and naphthalene diisocyanate, and aliphatic or alicyclic diisocyanates such as hexamethylene diisocyanate, lysine diisocyanate, cyclohexane diisocyanate, isophorone diisocyanate, 4,4'-dicyclohexylmethane diisocyanate, 1,3-bisisocyanatomethylcyclohexane, and tetramethylxylylene diisocyanate. In addition, alofanate products, adduct products, biuret products, isocyanurate products and the like of the polyisocyanates exemplified above may be exemplified. Examples of commercial polyisocyanate products include Coronate HX, Coronate HXR, Coronate HXLV, Coronate HK, Coronate 2715, Coronate HL, Coronate L, Coronate 2037, HDI, TDI, MDI (commercially available from Tosoh Corporation), Takenate 500, Takenate 600, Duranate 24A-100, TPA-100, TKA-100, P301-75E, and Takenate D-110N, D-120N, D-127N, D-140N, D-160N, D15N, D-170N, D-170HN, D-172N, D-177N, D-178N, D-101E (commercially available from Mitsui Chemicals, Inc.).

In the polymerizable composition for forming a primer layer, the content of the component B may be, for example, 20.0 mass % or more, and may be 30.0 mass % or more, and may be 35.0 mass % or more based on a total amount of 100 mass % of the composition (excluding the polymerization initiator). In addition, in the polymerizable composition for forming a primer layer, the content of the component B may be, for example, 90.0 mass % or less, may be 85.0 mass % or less and may be 80.0 mass % or less based on a total amount of 100 mass % (excluding the polymerization initiator) of the composition.

When the polymerizable composition for forming a primer layer contains a polyisocyanate, the content of the polyisocyanate may be, for example, 10.0 mass % or more, may be 15.0 mass % or more, and may be 20.0 mass % or more based on a total amount of 100 mass % of the composition (excluding the polymerization initiator). In addition, in the polymerizable composition for forming a primer layer, the content of the polyisocyanate may be, for example, 80.0 mass % or less, may be 75.0 mass % or less, and may be 70.0 mass % or less based on a total amount of 100 mass % of the composition (excluding the polymerization initiator).

The polymerizable composition for forming a primer layer may further contain a polymerization initiator. For the polymerization initiator, the above description can be referred to. The polymerizable composition for forming a primer layer may contain, for example, a polymerization initiator in a content range of 0.1 to 5.0 mass %, based on a total amount of 100 mass % of the component B and the polyisocyanate.

The polymerizable composition for forming a primer layer may or may not contain a solvent. When the composition contains a solvent, any solvent in an arbitrary amount can be used as a usable solvent as long as it does not inhibit progress of the polymerization reaction of the polymerizable composition.

The polymerizable composition for forming a primer layer may additionally contain known additives that can be generally added to the composition for forming a primer layer in an arbitrary amount. Known compounds can be used as these additives.

The polymerizable composition for forming a primer layer can be prepared by simultaneously or sequentially mixing the various components described above in any order.

When the polymerizable composition for forming a primer layer is applied to a substrate, and a curing treatment is performed on the applied composition, a primer layer, which is a cured layer obtained by curing the polymerizable composition for forming a primer layer, can be formed on the substrate. For the coating method, the above description can be referred to. In order to clean the surface of the substrate or the like, one or more known pretreatments such as an alkaline treatment and a UV ozone treatment can be arbitrarily performed on the surface of the substrate before application. The curing treatment may be light emission and/or heat treatment, and the curing treatment may be light emission in order for the curing reaction to proceed in a short time. Curing treatment conditions may be determined according to the types of various components contained in the polymerizable composition for forming a primer layer and the formulation of the polymerizable composition for forming a primer layer.

The thickness of the primer layer may be, for example, 3 µm or more, and may be 5 µm or more. In addition, the thickness of the primer layer may be, for example, 15 µm or less, and may be 10 µm or less.

The optical article having the photochromic layer may additionally have one or more functional layers in addition to the above various layers or may not. Examples of functional layers include layers known as functional layers of the optical article such as a protective layer, an anti-reflective layer, a water repellent or hydrophilic antifouling layer, and an anti-fogging layer for improving the durability of the optical article.

One aspect of the optical article is a spectacle lens. In addition, as one aspect of the optical article, a goggles lens, a visor (cap) of a sun visor, a shield member of a helmet, and the like may be exemplified. The composition is applied to the substrate for the optical article, a curing treatment is performed on the applied composition to form a photochromic layer, and thus an optical article having an anti-glare function can be obtained.

[Eyeglasses]

One aspect of the present disclosure relates to eyeglasses including the spectacle lens which is one aspect of the optical article. The details of the spectacle lens included in the eyeglasses are as described above. When the eyeglasses include such a spectacle lens, for example, the photochromic compound contained in the photochromic layer develops a color when hit with sunlight outdoors and an anti-glare effect can be exhibited like sunglasses, and when returned to indoors, the photochromic compound can fade to restore transmission. Known techniques can be applied to the configuration of the frame and the like for the eyeglasses.

EXAMPLES

Hereinafter, the present disclosure will be described in more detail with reference to examples. However, the present disclosure is not limited to the embodiments shown in the examples.

[Spectacle Lens 1]
<Preparation of Polymerizable Composition for Optical Article (Coating Composition for Forming Photochromic Layer)>

In a plastic container, 58 parts by mass of polyethylene glycol dimethacrylate (in Formula 2, n=14, R represents an ethylene group, a molecular weight of 736) as the component A, 30 parts by mass of hydroxy group-containing bifunctional methacrylate having the following structure:

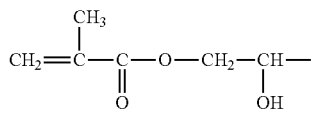 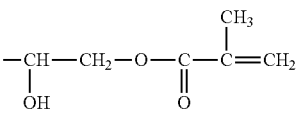

as the component B, and 12 parts by mass of trimethylolpropane trimethacrylate (a molecular weight of 296) as the component C were mixed.

In the mixture of the polymerizable compounds obtained in this manner, a photochromic compound (indeno-fused naphthopyran compound represented by the structural formula described in U.S. Pat. No. 5,645,767), a photoradical polymerization initiator (bis(2,4,6-trimethylbenzoyl) phenylphosphine oxide (Omnirad 819 commercially available from IGM Resin B.V.)), an antioxidant (bis[3-(3-tert-butyl-4-hydroxy-5-methylphenyl)propionic acid] [ethylene bis (oxyethylene)]), and a light stabilizer (bis(1,2,2,6,6-pentamethyl-4-piperidyl)sebacate) were mixed and sufficiently stirred. Then, defoaming was performed with a rotation/revolution type stirring defoaming device. Accordingly, a polymerizable composition for an optical article (coating composition for forming a photochromic layer) was prepared.

Based on a total amount of 100 mass % of the composition, the content of the above components was 94.90 mass % for the mixture of the polymerizable compounds, 3.00 mass % for the photochromic compound, 0.30 mass % for the photoradical polymerization initiator, 0.90 mass % for the antioxidant, and 0.90 mass % for the light stabilizer.

In the composition, based on a total amount of 100 mass % of the polymerizable compounds, the content of the component A was 58.0 mass %, the content of the component B was 30.0 mass %, and the content of the component C was 12.0 mass %.

<Production of Spectacle Lens>

A plastic lens substrate (product name EYAS commercially available from HOYA; a central wall thickness of 2.5 mm, a radius of 75 mm, S-4.00) was immersed in a 10 mass % sodium hydroxide aqueous solution (a liquid temperature of 60° C.) for 5 minutes and then washed with pure water and dried. Then, a primer layer was formed on a convex surface (object-side surface) of the plastic lens substrate. Specifically, 60 parts by mass of hydroxy group-containing bifunctional acrylate having the following structure:

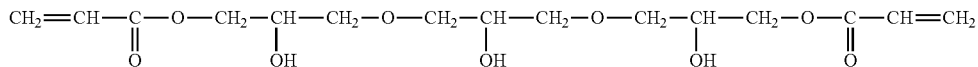

as the component B, and 40 parts by mass of Coronate 2715 (commercially available from Tosoh Corporation) as the polyisocyanate were mixed. The mixture obtained in this manner was mixed with an amount of 0.2 mass % of the photoradical polymerization initiator (bis(2,4,6-trimethylbenzoyl)phenylphosphine oxide (Omnirad 819 commercially available from IGM Resin B.V.)) based on a total amount of 100 mass % of the mixture, and sufficiently stirred. Then, defoaming was performed with a rotation/revolution type stirring defoaming device. The polymerizable composition for forming a primer layer obtained in this manner was applied to a convex surface of the plastic lens substrate in an environment of a temperature of 25° C. and a relative humidity of 50% by a spin coating method, ultraviolet rays (a wavelength of 405 nm) were then emitted to the composition for forming a primer layer applied onto the plastic lens substrate in a nitrogen atmosphere (an oxygen concentration of 500 ppm or less), and the composition was cured to form a primer layer. The thickness of the formed primer layer was 8 μm.

The coating composition for forming a photochromic layer prepared above was applied onto the primer layer by a spin coating method. Spin coating was performed by the method described in Japanese Patent Application Publication No. 2005-218994. Then, ultraviolet rays (a wavelength of 405 nm) were emitted to the composition applied onto the plastic lens substrate in a nitrogen atmosphere (an oxygen concentration of 500 ppm or less), and the composition was cured to form a photochromic layer. The thickness of the formed photochromic layer was 40 μm.

Accordingly, a spectacle lens having a photochromic layer was produced.

In addition, a spectacle lens having a photochromic layer with a thickness of 25 μm was produced by changing the amount of the composition for forming a photochromic layer applied.

[Spectacle Lens 2]

Two spectacle lenses having different thicknesses were produced in the same method as in Example 1 except that 68 parts by mass of the component A (polyethylene glycol dimethacrylate) was used, and 20 parts by mass of 1,9-nonane diol diacrylate as the component D in place of the component B was used.

[Evaluation of Adhesion]

For the spectacle lenses, the adhesion between the photochromic layer and the primer layer, which is an adjacent layer, was evaluated by a crosscut method according to JIS K5600-5-6:1999.

Regarding the adhesion with respect to the adjacent layer, generally, as the thickness of the photochromic layer is thinner, it tends to be more advantageous. Therefore, it is also desirable for a thick photochromic layer to have excellent adhesion with respect to an adjacent layer. For the spectacle lens 2, in evaluation by the crosscut method at a thickness of 40 μm, the number of peeled squares among 100 squares was 10. On the other hand, for the spectacle lens 1, in evaluation by the crosscut method at a thickness of 40 μm, the number of peeled squares among 100 squares was 2. Based on the above results, it was confirmed that the photochromic layer of the spectacle lens 1 had better adhesion with respect to an adjacent layer than the photochromic layer of the spectacle lens 1. Here, for the spectacle lenses 1 and 2, in the case of a thickness of 25 μm, in evaluation by the crosscut method, the number of peeled squares among 100 squares was in a range of 0 to 5.

[Spectacle Lens 3]

A spectacle lens 3 was produced in the same method as in the spectacle lens 1 except that the formulation of the polymerizable composition used for forming the photochromic layer of the spectacle lens 1 was changed, 68 parts by mass of polyethylene glycol dimethacrylate (in Formula 2, n=14, R represents an ethylene group, a molecular weight of 736) as the component A, 5 parts by mass of the hydroxy group-containing bifunctional methacrylate having the structure shown above as the component B, 12 parts by mass of trimethylolpropane trimethacrylate (a molecular weight of 296) as the component C, and 5 parts by mass of 1,9-nonane diol diacrylate as the component D were mixed.

[Spectacle Lens 4]

A spectacle lens 4 was produced in the same method as in the spectacle lens 3 except that the formulation of the polymerizable composition used for forming a photochromic layer of the spectacle lens 3 was changed, no component B was added, and instead of the component B, the amount of 1,9-nonane diol diacrylate added as the component D was increased to 20 parts by mass.

[Evaluation of Performance of Photochromic Layer]

The transmittance (measurement wavelength: 550 nm) of each spectacle lens was measured with a spectrophotometer (commercially available from Otsuka Electronics Co., Ltd.) before the following transmittance during color development was measured. Hereinafter, the transmittance measured in this manner will be referred to as "initial transmittance."

Then, for the photochromic layers of the spectacle lenses, light was emitted to the surface of the photochromic layer through an aerosol mass filter using a xenon lamp for 15 minutes (900 seconds), and the photochromic compound in the photochromic layer was caused to develop a color. The transmittance (measurement wavelength: 550 nm) during color development was measured with a spectrophotometer (commercially available from Otsuka Electronics Co., Ltd.). The light emission was performed so that the tolerances of the irradiance and the irradiance specified in JIS T7333:2005 were values shown in the following Table 1.

TABLE 1

| Wavelength range (nm) | Irradiance (W/m$^2$) | Tolerance of irradiance (W/m$^2$) |
| --- | --- | --- |
| 300 to 340 | <2.5 | — |
| 340 to 380 | 5.6 | ±1.5 |
| 380 to 420 | 12 | ±3.0 |
| 420 to 460 | 12 | ±3.0 |
| 460 to 500 | 26 | ±2.6 |

After the transmittance (hereinafter referred to as a "transmittance during color development") was measured, a time (half-life) required from the time when light emission was stopped until the transmittance (measurement wavelength: 550 nm) became [(initial transmittance-transmittance during color development)/2] was measured. It could be determined that a smaller value of the half-life measured in this manner indicates a faster fade rate and better photoresponsivity.

The above results are shown in Table 2.

TABLE 2

|  | Half-life (sec) |
| --- | --- |
| Spectacle lens 3 | 68 |
| Spectacle lens 4 | 68 |

Based on the results shown in Table 2, it can be said that, in the spectacle lens 3, the component B had no influence on the photoresponsivity of the photochromic layer.

Finally, the above aspects will be summarized.

According to one aspect, there is provided a polymerizable composition for an optical article including a photochromic compound, the component A, and the component B.

According to the composition, it is possible to form a photochromic layer having excellent adhesion with respect to an adjacent layer.

In one aspect, the composition may further include the component C.

In one aspect, the composition may further include the component D.

In one aspect, the composition may contain 50.0 mass % or more of the component A based on a total amount of the polymerizable compounds contained in the composition.

In one aspect, the composition may contain 5.0 mass % or more and 40.0 mass % or less of the component B based on a total amount of the polymerizable compounds contained in the composition.

According to one aspect of the present disclosure, there is provided an optical article including a substrate and a photochromic layer obtained by curing the composition.

In one aspect, the optical article may be a spectacle lens.

In one aspect, the optical article may be a goggles lens.

In one aspect, the optical article may be a visor of a sun visor.

In one aspect, the optical article may be a shield member of a helmet.

According to one aspect, there are provided eyeglasses including the spectacle lens.

Two or more of the various aspects and forms described in this specification can be combined in arbitrary combinations.

The embodiments disclosed herein are only examples in all respects and should not be considered as restrictive. The scope of the present disclosure is not limited to the above description, but is defined by the scope of claims, and is intended to encompass equivalents to the scope of claims and all modifications within the scope of the claims.

The present disclosure is beneficial in the technical fields of eyeglasses, goggles, sun visors, helmets and the like.

What is claimed is:

1. A polymerizable composition,
which is a polymerizable composition for an optical article, and comprises:
a photochromic compound;
a component A: an acyclic methacrylate having a molecular weight of 500 or more; and
a component B: a hydroxy group-containing (meth) acrylate, wherein component B has the following features:
(i) an epoxy ester structure,
(ii) is a hydroxy group-containing bifunctional (meth) acrylate, and
(iii) a part of or all of the hydroxy group(s) included in the component B are hydroxy group(s) included in the epoxy ester structure.

2. The polymerizable composition according to claim 1, further comprising
a component C: an acyclic tri- or higher-functional (meth) acrylate.

3. The polymerizable composition according to claim 1, further comprising
a component D: having a molecular weight of 400 or less and represented by the following Formula 2:

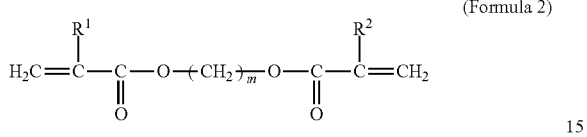

(Formula 2)

[in Formula 2, $R^1$ and $R^2$ each independently represent a hydrogen atom or a methyl group, and m represents an integer of 1 or more].

4. The polymerizable composition according to claim 1, wherein the composition contains 50.0 mass % or more of the component A based on a total amount of the polymerizable compounds contained in the composition.

5. The polymerizable composition according to claim 1, wherein the composition contains 5.0 mass % or more and 40.0 mass % or less of the component B based on a total amount of the polymerizable compounds contained in the composition.

6. An optical article, comprising:
a substrate; and
a photochromic layer obtained by curing the polymerizable composition according to claim 1.

7. The optical article according to claim 6, which is a spectacle lens.

8. The optical article according to claim 6, which is a goggles lens.

9. The optical article according to claim 6, which is a visor of a sun visor.

10. The optical article according to claim 6, which is a shield member of a helmet.

11. Eyeglasses including the spectacle lens according to claim 7.

* * * * *